United States Patent
Sugiyama et al.

(10) Patent No.: US 10,078,829 B2
(45) Date of Patent: Sep. 18, 2018

(54) INFORMATION PROCESSING DEVICE, TRANSACTION PROCESSING SYSTEM, AND RECORDING DEVICE

(71) Applicant: Seiko Epson Corporation, Tokyo (JP)

(72) Inventors: Yuichi Sugiyama, Matsumoto (JP); Koji Nishizawa, Shiojiri (JP); Shigeru Hirai, Aoki-mura (JP)

(73) Assignee: Seiko Epson Corporation, Tokyo (JP)

( * ) Notice: Subject to any disclaimer, the term of this patent is extended or adjusted under 35 U.S.C. 154(b) by 305 days.

(21) Appl. No.: 14/857,628

(22) Filed: Sep. 17, 2015

(65) Prior Publication Data
US 2016/0103635 A1   Apr. 14, 2016

(30) Foreign Application Priority Data
Oct. 10, 2014 (JP) .................................. 2014-208787

(51) Int. Cl.
| | | |
|---|---|---|
| *G07G 1/12* | (2006.01) | |
| *G07G 5/00* | (2006.01) | |
| *G06Q 40/00* | (2012.01) | |
| *H04N 1/00* | (2006.01) | |
| *G06Q 20/20* | (2012.01) | |
| *G06F 3/12* | (2006.01) | |
| *G06Q 20/22* | (2012.01) | |
| *G06Q 20/40* | (2012.01) | |

(52) U.S. Cl.
CPC ......... *G06Q 20/209* (2013.01); *G06F 3/1206* (2013.01); *G06F 3/1241* (2013.01); *G06F 3/1273* (2013.01); *G06F 3/1288* (2013.01); *G06Q 20/227* (2013.01); *G06Q 20/405* (2013.01); *G07G 5/00* (2013.01)

(58) Field of Classification Search
None
See application file for complete search history.

(56) References Cited

U.S. PATENT DOCUMENTS

| | | | |
|---|---|---|---|
| 9,477,420 B2 * | 10/2016 | Yadav | G06F 17/30153 |
| 2004/0028266 A1 * | 2/2004 | Jones | G06Q 20/042 382/135 |
| 2004/0032083 A1 * | 2/2004 | Walker | G06Q 10/087 273/269 |
| 2007/0077983 A1 * | 4/2007 | Amada | A63F 3/0615 463/17 |

(Continued)

FOREIGN PATENT DOCUMENTS

| | | | |
|---|---|---|---|
| JP | 58-086663 A | 5/1983 | |
| JP | 09-330480 A | 12/1997 | |

(Continued)

*Primary Examiner* — Ariel J Yu
(74) *Attorney, Agent, or Firm* — Nutter McClennen & Fish LLP; John J. Penny, Jr.

(57) ABSTRACT

The recording device 12 of a transaction processing system 1 sends main print data instructing printing a main receipt, which is a receipt for a single transaction, or partial receipt print data instructing printing partial receipts, which are receipts produced when payment for a single transaction is split between multiple parties, to a control server 15. The control server 15 receives the main print data and the partial receipt print data, and stores information based on the main print data or information based on the partial receipt print data in a transaction information manager database 421.

14 Claims, 8 Drawing Sheets

(56) References Cited

U.S. PATENT DOCUMENTS

2009/0319546 A1* 12/2009 Shaik ................ G06F 17/30563
2014/0092415 A1    4/2014 Yokoyama
2014/0164234 A1*  6/2014 Coffman ................ G06Q 20/14
                                                            705/40

FOREIGN PATENT DOCUMENTS

| JP | 2004-348364 A | 12/2004 |
| JP | 2012-027633 A | 2/2012 |
| JP | 2014-071647 A | 4/2014 |
| JP | 2014-085863 A | 5/2014 |

* cited by examiner

```
                                    R1
                                    ↙
            ┌─────────────────────────────┐
            │         RAMEN XXX           │
            │       11239 XXX a Blvd.     │
            │       Studio City, CA XXX   ← J1
            │       TEL (XX) XX-XXX       │
            │       FAX (XX) XX-XXX       │
            │                             │
            │  Check#:  SAMPLESTORE517117 ← J2
            │  Server:  Test10  ← J3      │
            │  6/18/2014        3:54:55 PM ← J4
       K →  │ - - - - - - - - - - - - - - │
            │  1   Coke             3.00 ← J5
            │  1   Orange Juice     3.50 ← J5
            │  1   Ocha             3.50 ← J5
            │  3   Otoko           42.00 ← J5
            │  1   Maboro          18.00 ← J5
       K →  │ - - - - - - - - - - - - - - │
            │    SubTotal          70.00 ← J6
            │    TAX(8.75%)         6.13 ← J7
            │    AMOUNT          $76.13  ← J8
            │                             │
            │       THANK YOU             │
            │       SEE YOU AGAIN  ← J9   │
            └─────────────────────────────┘
```

FIG. 4

TRANSACTION INFORMATION MANAGER DATABASE (421)

| RECORDING DEVICE IDENTIFICATION INFORMATION | BUSINESS INFORMATION | RECEIPT ID | CASH REGISTER OPERATOR INFORMATION | RECEIPT DATE INFORMATION | PURCHASED PRODUCT INFORMATION | | | SUBTOTAL INFORMATION | TAX INFORMATION | TRANSACTION TOTAL INFORMATION |
|---|---|---|---|---|---|---|---|---|---|---|
| | | | | | PURCHASED QUANTITY | PRODUCT NAME | UNIT PRICE | | | |
| | | | | ⋮ | | | | | | |
| A001 | RAMEN XXX ... | SAMPLESTORE517117 | Test10 | 6/18/2014 3:54:55 PM | 1 | Coke | 3.00 | 70.00 | 6.13 | $76.13 |
| | | | | | 1 | Orange Juice | 3.50 | | | |
| | | | | | 1 | Ocha | 3.50 | | | |
| | | | | | 3 | Otoko | 42.00 | | | |
| | | | | | 1 | Maboro | 18.00 | | | |
| | | | | ⋮ | | | | | | |

```
                    RS1                            RS2                            RS3
          ┌─────────────────────┐       ┌─────────────────────┐       ┌─────────────────────┐
          │      RAMEN XXX      │       │      RAMEN XXX      │       │      RAMEN XXX      │
          │   11239 XXX a Blvd. │       │   11239 XXX a Blvd. │       │   11239 XXX a Blvd. │
          │   Studio City, CA XXX│      │   Studio City, CA XXX│      │   Studio City, CA XXX│
          │     TEL (XX) XX-XXX │       │     TEL (XX) XX-XXX │       │     TEL (XX) XX-XXX │
          │     FAX (XX) XX-XXX │       │     FAX (XX) XX-XXX │       │     FAX (XX) XX-XXX │
          │                     │       │                     │       │                     │
          │Check#: SAMPLESTORE517117 BASE│   │Check#: SAMPLESTORE517118 517117│ │Check#: SAMPLESTORE517119 517117│
          │Server : Test10      │       │Server : Test10      │       │Server : Test10      │
          │6/18/2014   3:55:45 PM│      │6/18/2014   3:55:45 PM│      │6/18/2014   3:55:44 PM│
          │- - - - - - - - - - -│       │- - - - - - - - - - -│       │- - - - - - - - - - -│
          │.34  Coke        1.00│       │.33  Coke        1.00│       │.33  Coke        1.00│
          │.34  Orange Juice 1.16│      │.33  Orange Juice 1.17│      │.33  Orange Juice 1.17│
          │.34  Ocha        1.16│       │.33  Ocha        1.17│       │.33  Ocha        1.17│
          │1    Otoko      14.02│       │1    Otoko      13.99│       │1    Otoko      13.99│
          │.34  Maboro      6.00│       │.33  Maboro      6.00│       │.33  Maboro      6.00│
          │- - - - - - - - - - -│       │- - - - - - - - - - -│       │- - - - - - - - - - -│
          │  SubTotal      23.34│       │  SubTotal      23.33│       │  SubTotal      23.33│
          │  TAX(8.75%)     2.03│       │  TAX(8.75%)     2.05│       │  TAX(8.75%)     2.05│
          │  AMOUNT      $25.37 │       │  AMOUNT      $25.38 │       │  AMOUNT      $25.38 │
          │                     │       │                     │       │                     │
          │      THANK YOU      │       │      THANK YOU      │       │      THANK YOU      │
          │     SEE YOU AGAIN   │       │     SEE YOU AGAIN   │       │     SEE YOU AGAIN   │
          └─────────────────────┘       └─────────────────────┘       └─────────────────────┘
                FIG. 6A                        FIG. 6B                        FIG. 6C
```

| RECORDING DEVICE IDENTIFICATION INFORMATION | BUSINESS INFORMATION | RECEIPT ID | CASH REGISTER OPERATOR INFORMATION | RECEIPT DATE INFORMATION | PURCHASED PRODUCT INFORMATION | | | SUBTOTAL INFORMATION | TAX INFORMATION | TRANSACTION TOTAL INFORMATION | |
|---|---|---|---|---|---|---|---|---|---|---|---|
| | | | | | PURCHASED QUANTITY | PRODUCT NAME | UNIT PRICE | | | | ~421 |
| | | | | | ⋮ | | | | | | |
| A001 | RAMEN XXX ... | SAMPLESTORE517117 Δ⋯ΔΔ BASE | Test10 | 6/18/2014 3:55:45 PM | .34 | Coke | 1.00 | 23.34 | 2.03 | $25.37 | ← RB1 |
| | | | | | .34 | Orange Juice | 1.16 | | | | |
| | | | | | .34 | Ocha | 1.16 | | | | |
| | | | | | 1 | Otoko | 14.02 | | | | |
| | | | | | .34 | Maboro | 6.00 | | | | |
| | | | | | ⋮ | | | | | | |

FIG. 7A

| RECORDING DEVICE IDENTIFICATION INFORMATION | BUSINESS INFORMATION | RECEIPT ID | CASH REGISTER OPERATOR INFORMATION | RECEIPT DATE INFORMATION | PURCHASED PRODUCT INFORMATION | | | SUBTOTAL INFORMATION | TAX INFORMATION | TRANSACTION TOTAL INFORMATION | |
|---|---|---|---|---|---|---|---|---|---|---|---|
| | | | | | PURCHASED QUANTITY | PRODUCT NAME | UNIT PRICE | | | | ~421 |
| | | | | | ⋮ | | | | | | |
| A001 | RAMEN XXX ... | SAMPLESTORE517117 Δ⋯ΔΔ BASE | Test10 | 6/18/2014 3:55:45 PM | .34 | Coke | 1.00 | 23.34 | 2.03 | $25.37 | ← RB1 |
| | | | | | .34 | Orange Juice | 1.16 | | | | |
| | | | | | .34 | Ocha | 1.16 | | | | |
| | | | | | 1 | Otoko | 14.02 | | | | |
| | | | | | .34 | Maboro | 6.00 | | | | |
| A001 | RAMEN XXX ... | SAMPLESTORE517118 Δ⋯ΔΔ 517117 | Test10 | 6/18/2014 3:55:45 PM | .33 | Coke | 1.00 | 23.33 | 2.05 | $25.38 | ← RB2 |
| | | | | | .33 | Orange Juice | 1.17 | | | | |
| | | | | | .33 | Ocha | 1.17 | | | | |
| | | | | | 1 | Otoko | 13.99 | | | | |
| | | | | | .33 | Maboro | 6.00 | | | | |
| A001 | RAMEN XXX ... | SAMPLESTORE517119 Δ⋯ΔΔ 517117 | Test10 | 6/18/2014 3:55:45 PM | .33 | Coke | 1.00 | 23.33 | 2.05 | $25.38 | ← RB3 |
| | | | | | .33 | Orange Juice | 1.17 | | | | |
| | | | | | .33 | Ocha | 1.17 | | | | |
| | | | | | 1 | Otoko | 13.99 | | | | |
| | | | | | .33 | Maboro | 6.00 | | | | |
| | | | | | ⋮ | | | | | | |

| RECORDING DEVICE IDENTIFICATION INFORMATION | BUSINESS INFORMATION | RECEIPT ID | CASH REGISTER OPERATOR INFORMATION | RECEIPT DATE INFORMATION | PURCHASED PRODUCT INFORMATION | | | SUBTOTAL INFORMATION | TAX INFORMATION | TRANSACTION TOTAL INFORMATION | |
|---|---|---|---|---|---|---|---|---|---|---|---|
| | | | | | PURCHASED QUANTITY | PRODUCT NAME | UNIT PRICE | | | | |
| | | | | ⋮ | | | | | | | |
| A001 | RAMEN XXX ... | SAMPLESTORE517117 | Test10 | 6/18/2014 3:54:55 PM | 1 | Coke | 3.00 | 70.00 | 6.13 | $76.13 | ←RC1 |
| | | | | | 1 | Orange Juice | 3.50 | | | | |
| | | | | | 1 | Ocha | 3.50 | | | | |
| | | | | | 3 | Otoko | 42.00 | | | | |
| | | | | | 1 | Maboro | 18.00 | | | | |
| A001 | RAMEN XXX ... | SAMPLESTORE517117 Δ···ΔΔ BASE | Test10 | 6/18/2014 3:55:45 PM | .34 | Coke | 1.00 | 23.34 | 2.03 | $25.37 | ←RB1 |
| | | | | | .34 | Orange Juice | 1.16 | | | | |
| | | | | | .34 | Ocha | 1.16 | | | | |
| | | | | | 1 | Otoko | 14.02 | | | | |
| | | | | | .34 | Maboro | 6.00 | | | | |
| A001 | RAMEN XXX ... | SAMPLESTORE517118 Δ···ΔΔ 517117 | Test10 | 6/18/2014 3:55:45 PM | .33 | Coke | 1.00 | 23.33 | 2.05 | $25.38 | ←RB2 |
| | | | | | .33 | Orange Juice | 1.17 | | | | |
| | | | | | .33 | Ocha | 1.17 | | | | |
| | | | | | 1 | Otoko | 13.99 | | | | |
| | | | | | .33 | Maboro | 6.00 | | | | |
| A001 | RAMEN XXX ... | SAMPLESTORE517119 Δ···ΔΔ 517117 | Test10 | 6/18/2014 3:55:45 PM | .33 | Coke | 1.00 | 23.33 | 2.05 | $25.38 | ←RB3 |
| | | | | | .33 | Orange Juice | 1.17 | | | | |
| | | | | | .33 | Ocha | 1.17 | | | | |
| | | | | | 1 | Otoko | 13.99 | | | | |
| | | | | | .33 | Maboro | 6.00 | | | | |
| | | | | ⋮ | | | | | | | |

FIG. 8

INFORMATION PROCESSING DEVICE, TRANSACTION PROCESSING SYSTEM, AND RECORDING DEVICE

Priority is claimed under 35 U.S.C. § 119 to Japanese Application no. 2014-208787 filed on Oct. 10, 2014 which is hereby incorporated by reference in their entirety.

BACKGROUND

1. Technical Field

The present disclosure relates to an information processing device, a transaction processing system, and a recording device.

2. Related Art

The cost of purchases made in stores and particularly restaurants, for example, is sometimes split between multiple parties with each party paying a portion of the bill. Technology related to producing receipts for each payer when the bill is shared is disclosed in JP-A-H9-330480, for example.

Information processing devices that store information based on print data for producing receipts in a database, and provide useful transaction-related information based on the stored information, are also known.

When a device that stores information based on print data such as in the information processing device described above stores information based on the print data for receipts that are produced when payment is split between multiple people, information that reflects processing the transaction appropriately to how the payment was split must be stored.

SUMMARY

The present disclosure enables processing print data related to receipts that are produced for split payment of a single invoice appropriately to how the payment was divided, and storing information based on the resulting print data.

To achieve the foregoing objective, an information processing device according to the disclosure has a control unit that stores in a database either information based on print data instructing printing a main receipt, which is a receipt for a single received transaction, or information based on partial receipt print data instructing printing partial receipts, which are receipts produced when payment for a single received transaction is split between multiple parties.

Thus comprised, print data related to receipts that are produced to reflect a bill being split between multiple parties can be processed appropriately to the split payment and store information based on the print data.

In an information processing device according to another aspect of the disclosure, the main print data includes a main receipt ID identifying the main receipt; the partial receipt print data contains a partial receipt ID having a specific relationship to the main receipt ID of the corresponding main print data; and based on the main receipt ID of the main print data and the partial receipt IDs of the partial receipt print data, the control unit stores in the database information based on either the main print data or the corresponding partial receipt print data.

Thus comprised, information based on either the main print data or the partial receipt print data can be stored in the database after determining based on the main receipt ID and the partial receipt ID if the mainprint data and the partial receipt print data are specifically related to each other.

In an information processing device according to another aspect of the disclosure, information based on the main print data is transaction information extracted from the main print data by the control unit; and information based on the partial receipt print data is transaction information extracted from the partial receipt print data by the control unit.

Thus comprised, print data related to receipts that are produced when a bill payment is split between multiple parties can be processed appropriately to the bill split, and transaction information based on the resulting print data can be stored.

To achieve the foregoing objective, another aspect of the disclosure is a transaction processing system including: a recording control device, and a control server that communicates through a network with the recording control device; the recording control device sending to the control server either or both main print data instructing printing a main receipt, which is a receipt for a single received transaction, or partial receipt print data instructing printing partial receipts, which are receipts produced when payment for a single received transaction is split between multiple parties; and the control server receiving the main print data and the partial receipt print data, and storing either information based on the main print data, or information based on the partial receipt print data, in a database.

Thus comprised, print data related to receipts that are produced to reflect a bill being split between multiple parties can be processed appropriately to the split payment and store information based on the print data.

In a transaction processing system according to another aspect of the disclosure, the main print data includes a main receipt ID identifying the main receipt; the partial receipt print data contains a partial receipt ID having a specific relationship to the main receipt ID of the corresponding main print data; and based on the main receipt ID of the main print data and the partial receipt IDs of the partial receipt print data, the control server stores in the database information based on either the main print data or the corresponding partial receipt print data.

Thus comprised, information based on either print data for a main receipt or a partial receipt can be stored in a database after determining based on the main receipt ID and partial receipt ID if the main print data and the partial receipt print data are specifically related to each other.

In a transaction processing system according to another aspect of the disclosure, information based on the main print data is transaction information extracted from the main print data by the control server; and information based on the partial receipt print data is transaction information extracted from the partial receipt print data by the control server.

Thus comprised, print data related to receipts that are produced when a bill payment is split between multiple parties can be processed appropriately to the bill split, and transaction information based on the resulting print data can be stored.

In a transaction processing system according to another aspect of the disclosure, the recording control device is a recording device that receives the main print data and the partial receipt print data from a POS terminal, and records based on the print data.

Because the recording device prints based on main print data and partial receipt print data received from a POS terminal, the recording device can send print data to the control server, and the control server can process print data related to receipts that are produced to reflect a bill being split between multiple parties appropriately to the split payment and store information based on the print data.

In a transaction processing system according to another aspect of the disclosure, the recording control device is a POS terminal that generates the main print data and the partial receipt print data, sends said print data to a recording device, and causes the recording device to record based on the print data.

Thus comprised, because the POS terminal sends print data to the recording device and causes the recording device to record based on the print data, the print data can be sent from the POS terminal to the control server, and the control server can process print data related to receipts that are produced to reflect a bill being split between multiple parties appropriately to the split payment and store information based on the print data.

Thus comprised, print data related to receipts that are produced to reflect a bill being split between multiple parties can be processed appropriately to the split payment and store information based on the print data.

To achieve the foregoing objective, another aspect of the disclosure is a recording device including a recording unit that prints on recording media; a communication unit that receives data for the recording unit to print; and a control unit that controls the communication unit to receive main print data instructing printing a main receipt, which is a receipt for a single received transaction, or partial receipt print data instructing printing partial receipts, which are receipts produced when payment for a single received transaction is split between multiple parties, controls the recording unit to print information based on the main print data or information based on the partial receipt print data received by the communication unit, and stores either information based on the main print data or information based on the partial receipt print data in a database.

Thus comprised, print data related to receipts that are produced to reflect a bill being split between multiple parties can be processed appropriately to the split payment and store information based on the print data.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 4 shows an example of a main receipt.

FIG. 5 shows the data structure of a transaction information management database.

FIGS. 6A-6C show an example of a partial receipt.

FIGS. 7A and 7B show another example of the data structure of a transaction information management database.

FIG. 8 shows another example of the data structure of a transaction information management database.

DESCRIPTION OF EMBODIMENTS

A preferred embodiment of the present disclosure is described below with reference to the accompanying figures.

Figure 1:
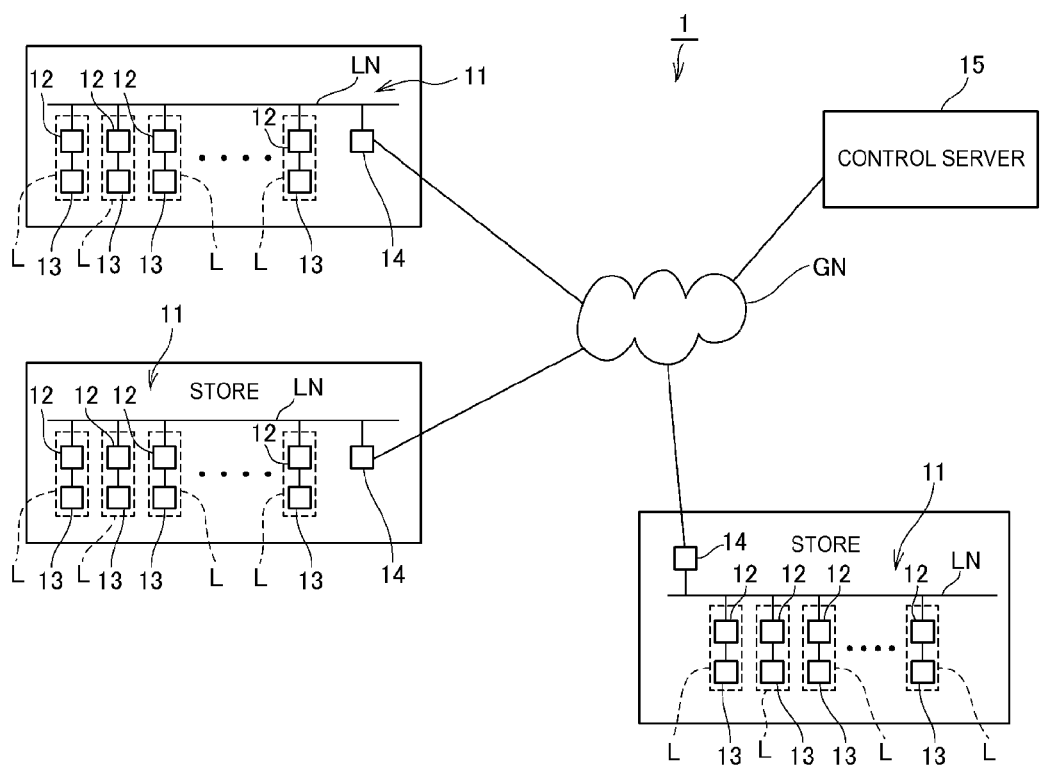
FIG. 1 illustrates the configuration of a transaction processing system according to a preferred embodiment of the disclosure.

FIG. 1 shows the configuration of a transaction processing system 1 according to a preferred embodiment of the disclosure.

As shown in FIG. 1, the transaction processing system 1 includes a plurality of store systems 11. A store system 11 is a system that is used in retail businesses such as supermarkets, convenience stores, department stores, and restaurants. The store system 11 has functions for processing transactions according to the products purchased by customers, and producing sales (transaction) receipts based on the transactions.

One or more checkout counters L where customer transactions are processed are located in the business. A recording device 12 (recording control device) capable of recording on a recording medium, and a POS terminal 13 that communicates with the recording device 12 and controls the recording device 12, are installed at each checkout counter L.

During a transaction at the checkout counter L, the cash register operator reads barcodes from the products or product packaging using a barcode reader BR connected to the POS terminal 13, and inputs information related to the transaction to the POS terminal 13. Based on input from the barcode reader BR and transaction-related input from the operator, the POS terminal 13 controls the recording device 12 to produce a receipt. The receipt produced by the recording device 12 is then given by the operator to the customer.

The configuration, functions, and processes based on the functions of the recording device 12 and POS terminal 13 are described further below.

A local area network LN is deployed in the store system 11.

The recording device 12 connects to the local area network LN using a communication protocol used on the LAN.

A communication device 14 is also connected to the local area network LN. The communication device 14 is an interface device that connects to the local area network LN and a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The recording device 12 can also access the global network GN through the communication device 14.

A control server 15 (information processing device) is connected to the global network GN. The control server 15 is a cloud server in a cloud system in which the recording device 12 is a client. More specifically, when triggered by a request from a client, for example, the control server 15 runs a specific operating process and sends data based on the result of the process to the client. The control server 15 is represented by a single function block in FIG. 1, but this does not mean that the control server 15 is embodied by a single server device. For example, the control server 15 may include a plurality of server devices. More specifically, the control server 15 may be configured in any way enabling executing the processes described below.

Figure 2:
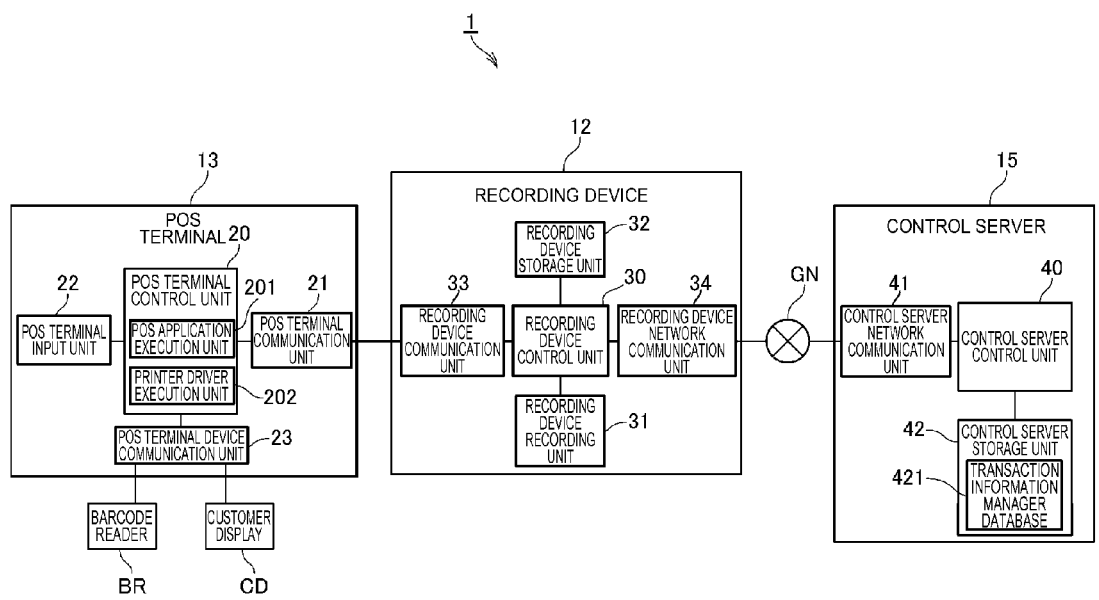
FIG. 2 is a block diagram illustrating the functional configuration of devices in the transaction processing system.

FIG. 2 is a block diagram illustrating the functional configuration of the POS terminal 13, recording device 12, and control server 15.

The POS terminal 13 is a host computer that runs transaction-related processes and controls the recording device 12.

As shown in FIG. 2, the POS terminal 13 includes a POS terminal control unit 20, a POS terminal communication unit 21, a POS terminal input unit 22, and a POS terminal device communication unit 23.

The POS terminal control unit 20 includes a CPU, ROM, RAM, and controls the POS terminal 13. The POS terminal control unit 20 has a POS application execution unit 201 and a printer driver execution unit 202. The function of the POS application execution unit 201 is embodied by the POS terminal control unit 20 reading and running an installed POS application. The function of the printer driver execution unit 202 is embodied by the POS terminal control unit 20 reading and running an installed printer driver. The processes run by these function blocks are described further below.

The POS terminal communication unit 21 communicates with the recording device 12 according to a specific communication protocol as controlled by the POS terminal control unit 20.

The POS terminal input unit 22 has an input means such as a keypad or operating keys, detects input to the input means, and outputs to the POS terminal control unit 20. Based on input from the POS terminal input unit 22, the POS terminal control unit 20 then executes a process appropriate to the input.

The POS terminal device communication unit 23 is an interface board with a USB port, a serial communication port other than a USB port, or other types of communication ports. Various devices can connect to the different ports. The POS terminal device communication unit 23 communicates with devices connected to the POS terminal 13 through the appropriate ports as controlled by the POS terminal control unit 20.

Note that the POS terminal device communication unit 23 may also have a wireless communication port and communicate with other devices wirelessly.

A barcode reader BR and customer display CD are examples of devices connected to the POS terminal 13 in this example.

The barcode reader BR is used to read barcodes from products and product packaging, and outputs data representing the read barcodes to the POS terminal device communication unit 23. The POS terminal device communication unit 23 then outputs the data input from the barcode reader BR to the POS terminal control unit 20.

The customer display CD displays transaction-related information as controlled by the POS terminal control unit 20. The information presented on the customer display CD can be read by the customer involved in the transaction at the checkout counter L.

The recording device 12 is a thermal line printer that holds roll paper and forms dots on the stored roll paper with a line thermal head to record images.

As shown in FIG. 2, the recording device 12 has a recording device control unit 30, a recording device recording unit 31, a recording device storage unit 32, a recording device communication unit 33, and a recording device network communication unit 34.

The recording device control unit 30 includes a CPU, ROM, RAM, and other peripheral circuits, and controls the recording device 12.

The recording device recording unit 31 includes mechanisms related to recording on roll paper, such as a conveyance mechanism for conveying roll paper stored inside the cabinet of the recording device 12, a recording mechanism for forming dots and recording images on the roll paper with a thermal head, and a cutter mechanism for cutting the roll paper at a specific position. The recording device recording unit 31 records receipt-related images on the roll paper by the recording mechanism while conveying the roll paper with the conveyance mechanism, and then cuts the roll paper at a specific position with the cutter mechanism, producing a receipt.

The recording device storage unit 32 has nonvolatile memory and stores data.

The recording device communication unit 33 communicates with the POS terminal 13 according to a specific communication protocol as controlled by the recording device control unit 30.

The recording device network communication unit 34 communicates with devices connected to the global network GN (including the control server 15) according to a specific communication protocol as controlled by the recording device control unit 30.

The control server 15 is a cloud server to which the recording device 12 connects as a client.

As shown in FIG. 2, the control server 15 includes a control server control unit 40 (control unit), control server network communication unit 41, and control server storage unit 42.

The control server control unit 40 includes a CPU, ROM, RAM, and other peripheral circuits, and controls the control server 15.

The control server network communication unit 41 communicates with devices connected to the global network GN (including recording devices 12) according to a specific communication protocol as controlled by the control server control unit 40.

The control server storage unit 42 includes nonvolatile memory, and stores data. The data stored by the control server storage unit 42 is described further below.

When a transaction is processed at the checkout counter L, payment for the transaction may be split between multiple parties. When payment is thus split between multiple parties, the POS terminal 13, recording device 12, and control server 15 in this embodiment of the disclosure execute the process described below.

Figure 3:
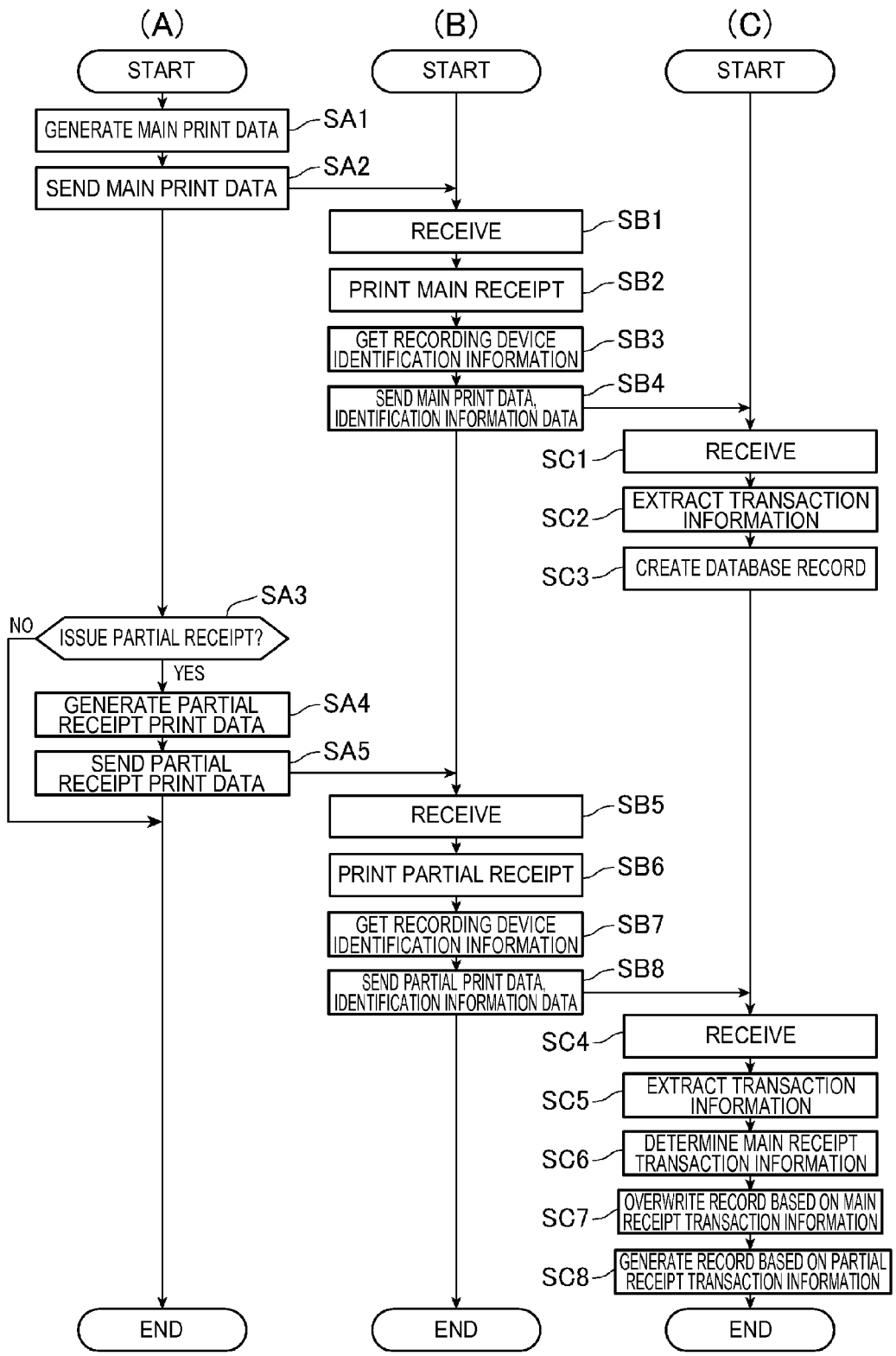
FIG. 3 is a flow chart illustrating the operation of devices in the transaction processing system.

FIG. 3 is a flow chart of the operation of the POS terminal 13, recording device 12, and control server 15, column (A) of FIG. 3 showing the operation of the POS terminal 13, column (B) of FIG. 3 showing the operation of the recording device 12, and column (C) of FIG. 3 showing the operation of the control server 15.

As shown in column (A) of FIG. 3, the POS terminal control unit 20 of the POS terminal 13 executes a payment process according to the customer transaction, and generates print data based on the payment process (step SA1). The print data is control data for producing a receipt.

More specifically, in step SA1, the POS application execution unit 201 of the POS terminal control unit 20 generates receipt information based on the customer transaction. The receipt information is information the recording device 12 records on the produced receipt.

Receipt information in this embodiment of the disclosure is described with reference to an example of a receipt.

FIG. 4 shows an example of a receipt R1.

Information such as the name, address, telephone number, or fax number of the store or business, referred to as store information J1 below, is recorded on the receipt R1 in the example shown in FIG. 4.

Also recorded on the receipt R1 is receipt identification information J2 including a receipt ID that identifies a specific receipt.

Also recorded on the receipt R1 is register operator identification information J3 (also referred to below operator information) including information such as the name of the operator of the register at the checkout counter L where the transaction is completed. The register operator identification information J3 is registered by a specific means in the POS terminal 13 before the transaction starts.

Also recorded on the receipt R1 is receipt date information J4 (also referred to below as needed as date information) including information indicating when the receipt is produced.

One or more lines of line item information J5 (also referred to below as needed as purchased product information) related to the products the customer purchases is also recorded on the receipt R1. The line item information J5 includes for each item the customer purchases information indicating the quantity (purchase quantity information) of the product on that line, information indicating the name of the product (product name information), and information indicating the unit price of the product (unit price information).

Subtotal information J6 (also referred to below as needed as subtotal information) including information indicating the subtotal is recorded on the receipt R1.

Also recorded on the receipt R1 is tax-related information J7 (also referred to below as needed as tax information) including information about the applicable taxes.

Also recorded on the receipt R1 is transaction total information J8 (also referred to below as needed as total amount information) including information indicating the transaction total.

Also recorded on the receipt R1 is message information J9 containing a specific message for the customer.

Delimiter information K that delimits parts of the receipt R1 is also recorded on the receipt R1 between the receipt date information J4 and the first line of line item information J5, and between the last line of line item information J5 and the subtotal information J6.

The receipt information in this sample receipt R1 includes the store information J1 to the message information J9, and the two delimiter information K lines.

In step SA1, the POS application execution unit 201 generates receipt information and outputs the resulting receipt information to the printer driver execution unit 202.

The printer driver execution unit 202 generates print data based on the receipt information input from the POS application execution unit 201. The print data is control data instructing producing a receipt with the receipt information recorded in a specific format, and includes plural control commands in the command language of the recording device 12.

The print data generated by the POS terminal 13 in step SA1 is referred to below as the main print data, and is distinguished from the partial receipt print data described further below. The main print data is print data for producing a receipt for a single payer, that is, a payment that is not split between multiple parties.

After generating the print data, the POS terminal control unit 20 controls the POS terminal communication unit 21 to send the resulting print data to the recording device 12 (step SA2).

As shown in column (B) of FIG. 3, the recording device control unit 30 of the recording device 12 controls the recording device communication unit 33 to receive the main print data (step SB1).

Next, the recording device control unit 30 controls the recording device recording unit 31 based on the main print data that was received to produce a receipt (step SB2).

A receipt produced by the recording device 12 in step SB2 is referred to below as a main receipt, which is different from a partial receipt as described below. A main receipt is a receipt that is produced based on the main print data and does not reflect a split payment. The receipt R1 shown in FIG. 4 is an example of a main receipt.

After printing a main receipt, the recording device control unit 30 gets the recording device identification information (step SB3). The recording device identification information is identification information identifying the recording device 12, and different, unique recording device identification information is assigned to each recording device 12. For example, the recording device identification information may be the serial number assigned to the recording device 12 when the recording device 12 is manufactured. The recording device identification information is stored in a specific storage area of the recording device storage unit 32, and in step SB3 the recording device control unit 30 reads the recording device identification information from the specific storage area.

Next, the recording device control unit 30 controls the recording device network communication unit 34 to send the main print data and identification information data representing the recording device identification information to the control server 15 (step SB4).

As shown in column (C) of FIG. 3, the control server control unit 40 of the control server 15 controls the control server network communication unit 41 to receive the main print data and identification information data (step SC1).

Next, the control server control unit 40 extracts the transaction information from the received main print data (step SC2). The transaction information is a specific subset of the information recorded on the receipt. In the receipt R1 shown in FIG. 4 for example in this embodiment of the disclosure, the transaction information includes the business (store) information, receipt ID, cash register operator information, receipt date information, purchased product information (purchase quantity information, product name information, unit price information), subtotal information, tax information, and total amount information.

Next, the control server control unit 40 accesses the transaction information manager database 421 stored by the control server storage unit 42 and creates a record based on the transaction information extracted in step SC2 (step SC3).

FIG. 5 illustrates the data structure of the transaction information manager database 421.

As shown in FIG. 5, one record in the transaction information manager database 421 contains recording device identification information and transaction information. The transaction information includes business information, receipt ID, operator information, receipt date information, purchased product information (purchase quantity information, product name information, unit price information), subtotal information, tax information, and total amount information.

In step SC3, the control server control unit 40 creates one record in the transaction information manager database 421, and stores the recording device identification information denoted by the identification information data received in step SC1 in the corresponding field of the created record.

The control server control unit 40 also stores the transaction information extracted in step SC2 in the corresponding fields of the created record.

Note that record RC1 in FIG. 5 shows an example of a record created based on the main print data used to print the receipt R1 in FIG. 4.

As shown in column (A) of FIG. 3, after sending the main print data, the POS terminal control unit 20 of the POS terminal 13 determines whether or not to print a partial receipt (step SA3).

A partial receipt is described first below, and the process of step SA3 is then described.

FIGS. 6A-6C show examples of the partial receipts that are produced when the bill is split between three people after producing the main receipt shown in FIG. 4. FIG. 6A shows a receipt RS1 as one example of a partial receipt, FIG. 6B shows a receipt RS2 as another example of a partial receipt, and FIG. 6C shows receipt RS3 as yet another example of a partial receipt.

As will be obvious from comparing the samples shown in FIG. 4 and FIGS. 6A-6C, a partial receipt is a receipt printed with the amounts of the purchase quantity information, unit price information, subtotal information, tax information, and total amount information in the main receipt divided by the number of people that are splitting the bill.

For example, the value of the purchase quantity information in the line item information J5 on the first line of the receipt R1 (main receipt) shown in FIG. 4 is 1, and the value of the unit price information is 3.00. In this event, as shown in FIGS. 6A-6C, the value of the purchase quantity information in the partial receipt that is printed is the value (1) of the purchase quantity in receipt R1 divided by the number of people (3) sharing the bill. The value of the total amount on each partial receipt that is printed is the value of the unit price information (3.00) on the main receipt R1 divided by the number of people (3). Note that if the value of any information on the main receipt cannot be evenly divided by the number of people, the values are adjusted by a predetermined method.

Note that a main receipt and partial receipt are related to each other means that the main receipt and the partial receipts are issued for a common single transaction.

Because payment is received from more than one person when the bill is split, the same number of partial receipts are printed as people paying. More specifically, plural partial receipts are printed.

There are also plural types of partial receipts, referred to below as parent partial receipts and child partial receipts. Of the plural partial receipts that are printed, one partial receipt is considered the parent partial receipt, and the other partial receipts are child partial receipts. For example, when three partial receipts are printed for three people splitting a bill, one of the three partial receipts is the parent partial receipt and the other two partial receipts are child partial receipts.

In the example shown in FIGS. 6A-6C, the receipt RS1 in FIG. 6A is the parent partial receipt, the receipt RS2 in FIG. 6B is a child partial receipt, and the receipt RS3 in FIG. 6C is also a child partial receipt.

In this embodiment of the disclosure, the receipt IDs of the main receipt and the related parent partial receipt are related as described below, and the receipt IDs of the parent partial receipt and the child partial receipts are related as described below.

Below, the receipt ID of the main receipt is called the main receipt ID, and the receipt ID of a partial receipt is called the partial receipt ID. The partial receipt ID of the parent partial receipt is called the parent partial receipt ID, and the partial receipt ID of a child partial receipt is called a child partial receipt ID.

The value of the main receipt ID of the main receipt shown for example in FIG. 4 is the string SAMPLESTORE517117. As shown in this example, the main receipt ID has an alphabetic portion (the string SAMPLESTORE in the example in FIG. 4) comprising a continuous string of alphabetic characters, followed by a numeric portion (the numeric string 517117 in the example in FIG. 4) comprising a continuous string of numbers following the alphabetic portion with no space therebetween.

The value of the parent partial receipt ID of the parent partial receipt shown in the example in FIG. 6A is the string SAMPLESTORE517117_ . . . _BASE" (where . . . denotes plural consecutive white spaces). The value of the parent partial receipt ID thus includes a parent partial receipt ID portion, which is the value of the main receipt ID of the corresponding main receipt (the portion corresponding to the string SAMPLESTORE517117 in the example in FIG. 6A), plural white spaces, and the string BASE.

Whether or not a receipt is a parent partial receipt can therefore be determined by checking if the string BASE is included in the receipt ID. The receipt ID of the matching main receipt (the main receipt ID) can also be acquired from a partial receipt using the parent partial receipt ID portion of the parent partial receipt ID information.

The value of the child partial receipt ID of the child partial receipt shown in FIG. 6B is the string SAMPLESTORE517118_ . . . _517117.

The value of the child partial receipt ID of the child partial receipt shown in FIG. 6C is the string SAMPLESTORE517119_ . . . _517117.

The value of the child partial receipt ID thus includes a child partial receipt ID portion (corresponding to the string SAMPLESTORE517118 in the example in FIG. 6B, and the string SAMPLESTORE517119 in the example in FIG. 6C), plural white spaces, and a related identification information portion (the string 517117 in the examples shown in FIGS. 6B and 6C).

The value of the child partial receipt ID is the sum of the value of the parent partial receipt ID of the parent partial receipt (that is, the value of the main receipt ID of the corresponding main receipt) plus 1 based on the number of child partial receipts that are issued. For example, if two child partial receipts are issued as in this example, the value of the child partial receipt ID of receipt RS2, which is the first child partial receipt shown in FIG. 6B, is the value of the parent partial receipt ID of the parent partial receipt (that is, the value of the main receipt ID of the corresponding main receipt) plus 1. The value of the child partial receipt ID of receipt RS3, which is the second child partial receipt shown in FIG. 6C, is the value of the child partial receipt ID of the first partial receipt R1 plus 1.

The value of the related identification information portion is the value (that is, the value of the numeric portion of the main receipt ID of the corresponding main receipt) of the numeric portion of the parent partial receipt ID of the parent partial receipt.

In step SA3, the POS terminal control unit 20 determines whether or not to issue partial receipts. The decision process is described below.

Using a specific input means of the POS terminal 13, the cash register operator can input a command to print partial receipts for a split bill, and the number of people splitting the bill. The operator inputs the command to print partial receipts and the number of people splitting the bill using the specific input means in response to a request from the customer.

In step SA3, the POS terminal control unit 20 decides to print partial receipts when the operator inputs the command to print partial receipts and the number of people splitting the bill within a specific time after printing the main receipt. This specific time may be preset in advance, or the period until the next transaction is started. The next transaction may start, for example, when a new barcode is read with the barcode reader BR.

If a partial receipt is not issued (step SA3 returns NO), the POS terminal control unit 20 ends the process.

If partial receipts are issued (step SA3 returns YES), the POS terminal control unit 20 generates print data (partial receipt print data) instructing printing a partial receipt for each partial receipt to print based on the number of people paying (step SA4).

In step SA4, the POS terminal control unit 20 generates partial receipt print data for each partial receipt to print. As described above, the value of the partial receipt ID (parent partial receipt ID and child partial receipts ID) specified in the partial receipt print data for recording is a value with a specific relationship to the value of the main receipt ID. The values of the purchase quantity information, unit price information, subtotal information, tax information, and total amount information in the print data for each partial receipt are the values of the same items in the related main receipt divided by the number of people splitting the bill.

Next, the POS terminal control unit 20 controls the POS terminal communication unit 21 to send the print data for the plural partial receipts to the recording device 12 (step SA5).

As shown in column (B) of FIG. 3, the recording device control unit 30 of the recording device 12 controls the recording device communication unit 33 to receive the print data for the plural partial receipts (step SB5).

Next, the recording device control unit 30 controls the recording device recording unit 31 to print the plural partial receipts based on the print data received for the plural partial receipts (step SB6).

Next, the recording device control unit 30 gets the recording device identification information (step SB7).

Next, the recording device control unit 30 controls the recording device network communication unit 34 to send the print data for the plural partial receipts relationally to the identification information data denoting the recording device identification information (step SB8).

As shown in column (C) of FIG. 3, the control server control unit 40 of the control server 15 controls the control server network communication unit 41 to receive the print data for the plural partial receipts (step SC4).

Next, the control server control unit 40 extracts the transaction information from the partial receipt print data (step SC5).

Below, the transaction information extracted from the partial receipt print data for printing the parent partial receipt is referred to as the parent transaction information, and the transaction information extracted from the partial receipt print data for printing a child partial receipt is referred to as child transaction information.

Next, the control server control unit 40 identifies the parent transaction information in the transaction information extracted in step SC5 from the print data generated for each partial receipt (step SC6). The transaction information includes the receipt ID as described above. The receipt ID of the partial receipt print data for printing the parent partial receipt (that is, the parent partial receipt ID) also contains the string BASE. As a result, in step SC6, the control server control unit 40 can find the parent transaction information by a string search for the string BASE to find the transaction information containing the string BASE in the receipt ID.

Next, the control server control unit 40 accesses the transaction information manager database 421 and overwrites the record generated in step SC3 (the record generated based on the main print data instructing printing the corresponding main receipt) with the record identified in step SC7 from the parent transaction information (step SC7).

More specifically in step SC7, the control server control unit 40 gets the value of the parent partial receipt ID part of the receipt ID (parent partial receipt ID) contained in the parent transaction information identified in step SC6. As described above, the value of the parent partial receipt ID portion matches the receipt ID of the corresponding main receipt (the main receipt ID). Next, the control server control unit 40 accesses the transaction information manager database 421, and acquires from the records in the database the record with a receipt ID that matches the value of the parent partial receipt ID that was acquired. Next, the control server control unit 40 overwrites the located record with a record based on the detected parent transaction information in step SC7.

As a result, the record based on the main print data for the main receipt is deleted from the transaction information manager database 421, and a new record based on the partial receipt print data for the parent partial receipt is stored in the database.

FIG. 7A shows the result of overwriting the record RC1 in FIG. 5 with a record RB1 based on the partial receipt print data for receipt RS1 (the parent partial receipt) in step SC7.

Next, the control server control unit 40 accesses the transaction information manager database 421 and creates a new record for the child transaction information acquired in step SC5 for each of the one or more child receipts (step SC8).

As a result, a record is saved in the transaction information manager database 421 for each partial receipt that is produced.

FIG. 7B shows the result of creating and storing record RB2 and record RB3 based on partial receipt print data for receipt RS2 (child partial receipt) and receipt RS3 (child partial receipt) in the transaction information manager database 421 in step SC8.

As described above, the control server control unit 40 in this embodiment of the disclosure creates records based on the transaction information for a main receipt in the transaction information manager database 421 when a main receipt is produced. When partial receipts are produced, the control server control unit 40 overwrites the record for the main receipt with a record for a parent partial receipt, and creates a record for each partial receipt that is printed in the transaction information manager database 421.

The effect of this is described below.

Specifically, the transaction information manager database 421 may later be used, for example, to analyze sales per store during a specific period of time, sales at a specific checkout counter L, sales of a specific product, and other transaction related information.

FIG. 8 shows an example of the transaction information manager database 421 when the record of the main receipt is not overwritten with a record related to the parent partial receipt when partial receipts are issued.

As shown in FIG. 8, when both the main receipt record and partial receipt records are stored in the transaction information manager database 421, duplicate records will be recorded for the same transaction. When tabulating and analyzing sales in this event, data will be tabulated based on the sales recorded in the main receipt and sales recorded in the partial receipts, and incorrect results may be computed. The same thing will happen when tabulating and analyzing the total sales of a specific product.

However, because a main receipt record and records for partial receipts are not both stored in the transaction information manager database 421 in this embodiment of the disclosure, such sales tabulation and computation errors, for example, can be prevented.

As described above, a transaction processing system 1 according to the disclosure has a recording device 12 (recording control device) and a control server 15.

The recording device 12 sends main print data for producing a main receipt, which is a receipt for a single-payer transaction, and partial receipt print data for producing partial receipts, which are receipts that are produced when payment for a single transaction is split between multiple parties.

The control server 15 receives the main print data and partial receipt print data, and stores information based on the main print data in the transaction information manager database 421 (database).

Thus comprised, because both information based on the main print data and information based on the partial receipt print data is stored in the transaction information manager database 421, calculation of erroneous statistics when analyzing and tabulating sales, for example, can be prevented. More specifically, the disclosure can store information based on print data resulting from a process appropriate to the characteristics of a shared bill when print data is generated to produce multiple receipts issued when a bill is shared by multiple people.

In this embodiment of the disclosure, the control server 15 deletes information based on the corresponding main print data from the transaction information manager database 421 based on the main receipt ID of the main print data and the partial receipt IDs of the partial receipt print data.

Thus comprised, information based on the partial receipt print data is stored in the transaction information manager database 421 after appropriately identifying the main print data and partial receipt print data related to the same transaction based on the main receipt ID and partial receipt IDs.

In the embodiment described above, the control server 15 deletes the record based on the main print data from the transaction information manager database 421, and stores records based on the partial receipt print data in the database. Alternatively, the control server 15 may register a record based on the main print data in the transaction information manager database 421, and not store records based on the partial receipt print data. This embodiment has the same effect as the embodiment described above.

EXAMPLE 1

An example of a first variation of the foregoing embodiment is described below.

The device that sends print data (main print data, partial receipt print data) to the control server 15 in the foregoing embodiment is the recording device 12. Alternatively, the POS terminal 13 and control server 15 may be communicatively connected through a global network GN, and the POS terminal 13 may send print data to the control server 15. In this event, the POS terminal 13 is example of a recording control device.

This configuration has the same effect as the embodiment described above.

EXAMPLE 2

An example of a second variation of the foregoing embodiment is described below.

In the embodiment described above, the recording device 12 that functions as a recording control device sends print data including both main print data and partial receipt print data to the control server 15. However, a configuration in which the recording device 12 sends only the main print data or the partial receipt print data, and the control server 15 receives the print data sent by the recording device 12, and stores a record based on the received print data in the transaction information manager database 421, is also conceivable. This configuration can prevent saving duplicative records based on the main print data and the partial receipt print data in the transaction information manager database 421, and can achieve the same effect as the embodiment described above.

EXAMPLE 3

An example of a third variation of the foregoing embodiment is described below.

The control server 15 in the foregoing embodiment stores records based on the main print data or records based on the partial receipt print data in the transaction information manager database 421. Alternatively, the recording device 12 may store a database corresponding to the transaction information manager database 421, and the recording device 12 may store records based on the main print data or the partial receipt print data.

In this event, the recording device control unit 30 functions as a control unit, and the recording device recording unit 31 functions as a storage unit.

The recording device 12 is also an example of an information processing device.

The disclosure is described above with reference to a preferred embodiment thereof, but the disclosure is not limited thereto and can be modified and adapted in many ways without departing from the scope of the accompanying claims.

Receipt R1 and receipts RS1 to RS3 are used as examples of receipts in the foregoing embodiment and processes of the disclosure are described with reference to these sample receipts. The layouts of the receipts are not limited to the foregoing examples, however, and the transaction information extracted from the receipts is not limited to the foregoing.

"Information based on print data" is transaction information in the foregoing example, but may be the print data itself.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:
1. An information processing device comprising a control unit configured to:
    extract and store in a database a main receipt record associated with a main receipt of a transaction based on received main print data, wherein the main print data is useable for printing the main receipt corresponding to the transaction, and the main receipt record includes a receipt ID;

extract and store in the database partial receipt records corresponding to respective portions of the transaction based on received partial receipt print data, wherein the partial receipt print data is useable for printing partial receipts corresponding to the portions of the transaction when payment for the transaction is split between multiple parties, and wherein each of the partial receipt records includes a corresponding partial receipt ID;

wherein at least one of the partial receipt records is stored such that it overwrites the main receipt record in the database.

2. The information processing device described in claim 1, wherein:

the main print data includes the main receipt ID corresponding to the main receipt, the partial receipt print data includes the partial receipt IDs corresponding to the partial receipt records, the partial receipt IDs having a specific relationship to the main receipt ID of the corresponding main print data, and wherein the storing of the at least one partial receipt record in the database such that it overwrites the main receipt record is performed based on the main receipt ID of the main print data and the partial receipt IDs of the partial receipt print data.

3. The information processing device described in claim 2, wherein the storing of the at least one partial receipt record in the database such that it overwrites the main receipt record is performed when the specific relationship between the main receipt ID of the main print data and the partial receipt IDs of the partial receipt print data indicates that they correspond to a same transaction.

4. The information processing device described in claim 1, wherein:

the main receipt record includes transaction information extracted from the main print data by the control unit; and each of the partial receipt records includes transaction information extracted from the partial receipt print data by the control unit.

5. A transaction processing system comprising:

a recording control device and a control server configured to communicate with one another through a network, wherein:

the recording control device sends to the control server main print data useable for printing a main receipt corresponding to a transaction;

the control server extract and stores in a database a main receipt record associated with the main receipt of the transaction based on the main print data, the main receipt record including a main receipt ID;

the recording control device sends to the control server partial receipt print data useable for printing partial receipts corresponding to portions of the transaction when payment for the transaction is split between multiple parties; and the control server extracting and storing in the database respective partial receipt records corresponding to each of the portions of the transaction based on the partial receipt print data, each of the partial receipt records including a corresponding partial receipt ID, wherein at least one of the partial receipt records is stored such that it overwrites the main receipt record in the database.

6. The transaction processing system described in claim 5, wherein:

the main print data includes the main receipt ID corresponding to the main receipt, the partial receipt print data includes the partial receipt IDs corresponding to the partial receipt records, the partial receipt IDs having a specific relationship to the main receipt ID of the corresponding main print data, and wherein the storing of the at least one partial receipt record in the database such that it overwrites the main receipt record is performed based on the main receipt ID of the main print data and the partial receipt IDs of the partial receipt print data.

7. The transaction processing system described in claim 5, wherein the storing of the at least one partial receipt record in the database such that it overwrites the main receipt record is performed when the specific relationship between the main receipt ID of the main print data and the partial receipt IDs of the partial receipt print data indicates that they correspond to the same transaction.

8. The transaction processing system described in claim 5, wherein:

the main receipt record includes transaction information extracted from the main print data by the control server; and each of the partial receipt records includes transaction information extracted from the partial receipt print data by the control server.

9. The transaction processing system described in claim 5, wherein:

the recording control device is a recording device that receives print data includes at least a portion of one or more of the main print data and the partial receipt print data from a POS terminal, and records based on the received print data.

10. The transaction processing system described in claim 5, wherein:

the recording control device is a POS terminal that:

generates print data including at least a portion of one or more of the main print data and the partial receipt print data, sends the print data to a recording device, and causes the recording device to record based on the print data.

11. A recording device comprising:

a recording unit configured to prints on recording media;

a communication unit configured to receive data for the recording unit to print; and a control unit configured to:

control the communication unit to receive main print data useable for printing a main receipt corresponding to a single transaction, or partial receipt print data useable for printing partial receipts, which are receipts corresponding to portions of the single transaction when payment for the single transaction is split between multiple parties, control the recording unit to print information based on the main print data or information based on the partial receipt print data received by the communication unit, store in a database a main receipt record based on the main print data, and store in a database respective partial receipt records corresponding to the portions of the single transaction based on the partial receipt print data, wherein at least one of the partial receipt records is stored such that it overwrites the main receipt record in the database.

12. The recording device described in claim 11, wherein:

the main print data includes the main receipt ID corresponding to the main receipt;

the partial receipt print data includes the partial receipt IDs corresponding to the partial receipt records, the partial receipt IDs having a specific relationship to the main receipt ID of the corresponding main print data, and wherein the storing of the at least one partial receipt record in the database such that it overwrites the main receipt record is performed based on the main receipt ID of the main print data and the partial receipt IDs of the partial receipt print data.

13. The recording device described in claim 12, wherein the storing of the at least one partial receipt record in the database such that it overwrites the main receipt record is performed when the specific relationship between the main receipt ID of the main print data and the partial receipt IDs of the partial receipt print data indicates that they correspond to a same transaction.

14. The recording device described in claim 12, wherein:

the main receipt record includes transaction information extracted from the main print data by the control unit; and the main receipt record includes transaction information extracted from the partial receipt print data by the control unit.

\* \* \* \* \*